(12) United States Patent
Wharton (10) Patent No.: US 6,595,052 B2
(45) Date of Patent: Jul. 22, 2003

(54) SELF-CALIBRATING MACHINES FOR BALANCING WORK PIECES AND METHODS OF MACHINE CALIBRATION

(75) Inventor: Paul O. Wharton, Lake Orion, MI (US)

(73) Assignee: Schenck Turner, Inc., Orion, MI (US)

( * ) Notice: Subject to any disclaimer, the term of this patent is extended or adjusted under 35 U.S.C. 154(b) by 0 days.

(21) Appl. No.: 10/189,700

(22) Filed: Jul. 3, 2002

(65) Prior Publication Data

US 2003/0005763 A1 Jan. 9, 2003

Related U.S. Application Data

(60) Provisional application No. 60/303,195, filed on Jul. 5, 2001.

(51) Int. Cl.$^7$ ................................................ G01M 1/22
(52) U.S. Cl. .......................................... 73/460; 73/1.14
(58) Field of Search .......................... 73/462, 468, 469, 73/470, 459, 460, 458, 457, 1.14; 700/279

(56) References Cited

U.S. PATENT DOCUMENTS

| | | | | |
|---|---|---|---|---|
| 3,681,967 A | * | 8/1972 | Hines et al. ................ | 73/462 |
| 4,494,400 A | * | 1/1985 | Hill .............................. | 73/462 |
| 4,776,215 A | * | 10/1988 | Curchod ...................... | 73/462 |
| 5,757,662 A | * | 5/1998 | Dyer et al. ................... | 73/462 |

* cited by examiner

*Primary Examiner*—Helen Kwok
(74) *Attorney, Agent, or Firm*—Reising, Ethington, Barnes, Kisselle, P.C.

(57) ABSTRACT

In this system an unbalancing force, as set by an unbalance load injection device integrated into a work piece balancing machine and its balance computer, is injected into an injection planethrough an operating portion of the machine. This injected load is in effect transferred by computation to a calibrating plane of a known standard or a masterwork part loaded into and rotatably driven by the balancing machine. The values of the unbalancing force as generated by the unbalance injecting device and by calculation into the rotating master are sensed by synchronizer and vibration pickups. Data reflective of the injected imbalance are furnished to the balance computer for the calibration thereof. The principle of this self-calibration is to use a workpiece drive spindle and unbalance injector device that can introduce a known unbalance, set by adjusting the unbalance injector device to inject a predetermined load at a known angle into the master to effect master unbalance. This induced unbalance is picked up by synchronizer units and used as the parameters in the calibration process of the balance compute. This allows the machine to accurately determining the imbalance in other work pieces. Subsequently conventional unbalanced work parts processed by the calibrated machine can be balanced by the machine with a higher-level of accuracy in accordance with balancing data of the calibrated balance computer.

10 Claims, 9 Drawing Sheets

SELF-CALIBRATING MACHINES FOR BALANCING WORK PIECES AND METHODS OF MACHINE CALIBRATION

Provisional application Serial No. 60/303,195 filed Jul. 5, 2001 is hereby cited for purposes of priority and such is hereby claimed.

BACKGROUND OF THE INVENTION

1. Field of the Invention

This invention generally relates to the precise correction of imbalance of rotating work pieces and more particularly to new and improved self-calibrating work piece balancing machines having the capability to automatically determine and correct the imbalance of rotating parts and to automatically self-calibrate under predetermined operating conditions and further to new and improved processes for the automatic calibration of work piece balancing machines.

2. Description of the Prior Art

Production equipment such as automatic work piece balancing machines for rotating metallic work pieces at high rotational speeds and effecting the dynamic balancing thereof by adding balancing weights in appropriate locations thereon or by removal of mass therefrom have been successfully employed for many years. Highly developed machines in this category have balance computers that calculate the amount of weight adjustment needed for dynamically balancing different work pieces and control the balancing speeds and many other machine operations. More particularly these balance computers function with the machine hardware to precisely locate the positions in selected balancing planes on the work piece where weight correction is needed for work piece balancing and for activating the tools to accomplish the actual weight correction. These precisioned operations are required for an effective single balancing operation or for the repeated rotational balancing of a quantity of unbalanced work pieces in mass production operations.

For such work, the balancing machines need to be precisely calibrated so that the exact location on each individual work piece for weight-adjustment can be quickly and precisely determined and the appropriate balance weight adjustment quickly made. Prior to the present invention, work piece balancing machines required a time consuming and tedious manual process of stopping and starting the rotating machine to manually add and remove calibration weights to a master or selected standard work piece for calibrating the machine. Such prior calibrating procedures were prone to various human errors and required great skill and care to avoid calibration mistakes. Personal care also had to be taken by the operator since it was generally necessary to physically handle, add, and remove calibration weights with respect to the standard or master and the starting and stopping of the machine for the calibration thereof.

SUMMARY OF THE INVENTION

In contrast to the prior machines and calibration processes, the new and improved self-calibrating work piece balancing equipment and processes of this invention reduces machine downtime for calibration and to a large extent eliminates the labor and skill including attention to precise detail previously required of the operator to manually calibrate a balancing machine. This advancement is achieved in this invention by the unique incorporation of one or more automatic load or force injecting units, hereinafter referenced as unbalance injector devices, into a new and improved dynamic balancing machine featuring automatic self calibration. These on-board devices provide hands-free selection and changing of calibration loads and along with other machine equipment cooperate to form and complete a new and improved self-calibrating work piece balancing machine. These unbalance injection devices are uniquely operative in this invention in that known unbalancing loads are automatically injected into the rotating chucks or other workpiece mountings of the machine to establish inertia axes offset from the rotational axis of a standard or master work piece rotatably driven therein. Known moments are resultantly established at predetermined correction planes that extend through the work piece whose values are fed to a balance computer of the machine for the automatic calibration thereof. Such calibration can be readily and quickly accomplished with minimal operator input and in many cases, while the master is being continuously rotatably driven. Moreover, these unbalance injector devices are generally arranged into the machine construction so that they are offset to one or both ends or extremities of a calibrating master or known standard workpiece operatively mounted for rotation in the machine. The physical characteristics of the calibrating work piece are not changed such as in prior calibration procedures and the calibrating workpieces are not physically handled or touched by the calibrating operator except for machine loading and unloading.

For single plane calibration, base line imbalance measurements are taken from the rotating master or known standard and fed to a balance computer incorporated into the balancing machine where the data is registered. The unbalance injection device is then automatically activated to inject known imbalance loads into a base injection plane of the machine. This plane may transversely extend through the unbalance injector device and the spindle or other machine component securing the calibrating work piece and operatively mounting the injector device for rotation of these components about a spin axis. This injected force is, in effect, linearly translated as an unbalancing load to the master in a predetermined correction or calibration plane parallel to the base plane and transverse of the work piece spin axis. The cradle supporting the work piece mounting and spinning equipment is usually mounted by suspension spring construction and is subject to vibratory excitation from the rotational imbalance of the master or standard during machine calibration, as well as from unbalanced workpieces subsequently balanced by the machine.

Vibratory and positional signals reflecting these known imbalance loads and the location of the eccentricity as applied to the standard or master by the unbalance injector device are received by synchronizer and vibration pick up units. Data from these pick-ups are fed to the balance computer in a first calibration thereof. The machine is stopped and the part rotated relative to the work piece holding chuck or other securement a predetermined number of degrees, 180 degrees for example. Known imbalance loads from the imbalance injection device are again injected into the machine and translated to the standard or master-work piece in the correction plane and the final calibration readings are taken. With known calibration imbalance loads applied in specific locations in known correction planes, the balance computer will identify and store the known imbalance data and calibrate with reference thereto.

With such calibration, the computer will subsequently recognize imbalance loads and eccentricities in unbalanced work pieces being processed with the machine and effect the accurate weight correction and location to effect the dynamic balancing of such work pieces.

For double plane calibration at least two unbalance injecting devices and associated controller are integrated the balancing machine and the balance computer thereof so that known unbalancing loads injected into a rotating portion of the machine are translated from the injection planes through the machine into calibration planes through a calibrating master or known standard workpiece operatively mounted in the machine. These calibrating planes are spaced apart from one another and the unbalancing loads cause the inertia axis of the master or standard to misalign with respect to the spin axis thereof. The magnitude of the resulting dynamic unbalance is used to calculate the moment or couple generated at a predetermined spin rpm. The injected unbalances generate vibrations, which are picked up by spaced pick up devices and generate data supplied to the balance computer to effect the calibration thereof.

This new and improved self-calibrating machine can be easily calibrated by different machine operators of varying skills including those that are mechanically oriented and can follow prescribed procedures but have little calibration experience. The machine may be conditioned for the automatic calibration mode after a known standard work piece or master is operatively mounted therein by operator initiative in simply starting the machine. Under computer control the known standard part is brought to a balancing speed and the unbalance injection device or devices under command from the balance computer are automatically actuated by the controller thereof so that the machine quickly and automatically calibrates the balance computer to the known imbalance injected into the master without human intervention.

This invention is further drawn to new and improved self-calibrating balancing machines for rotating and determining balancing points on work pieces and to the physical balancing of work pieces and to new and improved machine calibration methods. With these machines and methods, work pieces such as propeller shafts, crankshafts and road wheels for vehicles can be quickly loaded into the machine and balanced with extraordinary and repeatable accuracy. In this invention, known and predetermined forces are automatically applied to a rotating standard or master calibrating work piece and are effective in a predetermined calibrating plane thereof to achieve the rotational imbalance thereof. Data directly resulting from these imbalance loads is fed to a balance computer of the machine to effect the calibration of the machine computer. This imbalance data is supplied from a synchronizer or positional pick up and from vibration pick-ups associated with the balancing machine and stored in the memory of the balance computer for subsequent reference in calculating the rotational imbalance and correction of unbalanced work pieces subsequently processed in the machine.

These self-calibrating balancing machines are generally equipped with specialized tooling that quickly makes the balancing adjustment by adding or subtracting work piece balancing weight in predetermined balancing planes thereof. With such equipment, unbalanced parts can be loaded and spun to predetermined speeds and then automatically balanced to provide improved quantity production. The machines of this invention require only minimal down-time for automatic calibration purposes and with improved accuracy to further improve operating efficiency particularly as compared to the prior manual calibration of balancing machines.

A general feature, object and advantage of this invention is to provide (1) new improved work piece balancing machines capable automatic self calibration and without stopping once a calibrating work piece is installed in the machine and (2) new and improved methods of calibrating such machines with at least one onboard unbalance injector device which can be operated to automatically inject predetermined imbalance forces to a known standard work piece and in at least one predetermined calibration plane thereof while it is being rotatably driven at predetermined speeds to effect calibration of a balance computer associated with the machine.

Another feature, object and advantage of this invention to provide a new and improved automated work piece balancing machine having a balance computer as part thereof that is functional to: (1) serially spin and determine the rotational imbalance of work pieces operatively mounted therein each generally having a principal inertia axis that is not parallel to the axis of rotation thereof and the weight variances necessary to correct such imbalance to physically effect the correction of such imbalance and (2) self-calibrate by effecting the injection of known loads of imbalance into predetermined points in at least two calibration planes of a calibrating standard work piece and then to feed data detailing such imbalances into a balance computer to teach the computer to recognize such imbalances and calibrate relative thereto. This allows the balance machine to be subsequently employed in the accurate dynamic balancing of interchangeable and unbalanced work pieces.

Another feature, object and advantage of this invention is to provide a new and improved process for automatically calibrating a work piece balancing machine in which a master or known standard work piece is continuously rotating during the calibration of the machine and in which the master or standard is rotatably driven and at least one unbalance force injecting device is utilized to inject known imbalance loads to the rotating workpiece to produce the rotational imbalance of the master and the feeding of resulting and exact imbalance data to an associated balance computer so that the balance computer is precisely calibrated and the machine can be subsequently employed with great accuracy to spin and detect imbalances in other work pieces and effect the accurate rotational balancing thereof.

Another feature object and advantage of this invention is to provide a new and improved self calibrating work piece balancing machine and method of calibration in which known imbalance loads are injected into a master or other calibrating work piece being rotatably driven in the balancing machine without physically changing the master such as by adding calibrating weights thereto.

These and other features, objects and advantages of this invention will become more apparent and understood from the following specifications including the detailed description and drawings in which:

DETAILED DESCRIPTION OF THE DRAWINGS

DETAILED DESCRIPTION OF THE PREFERRED EMBODIMENTS

Figures 1, 1A, 1B:
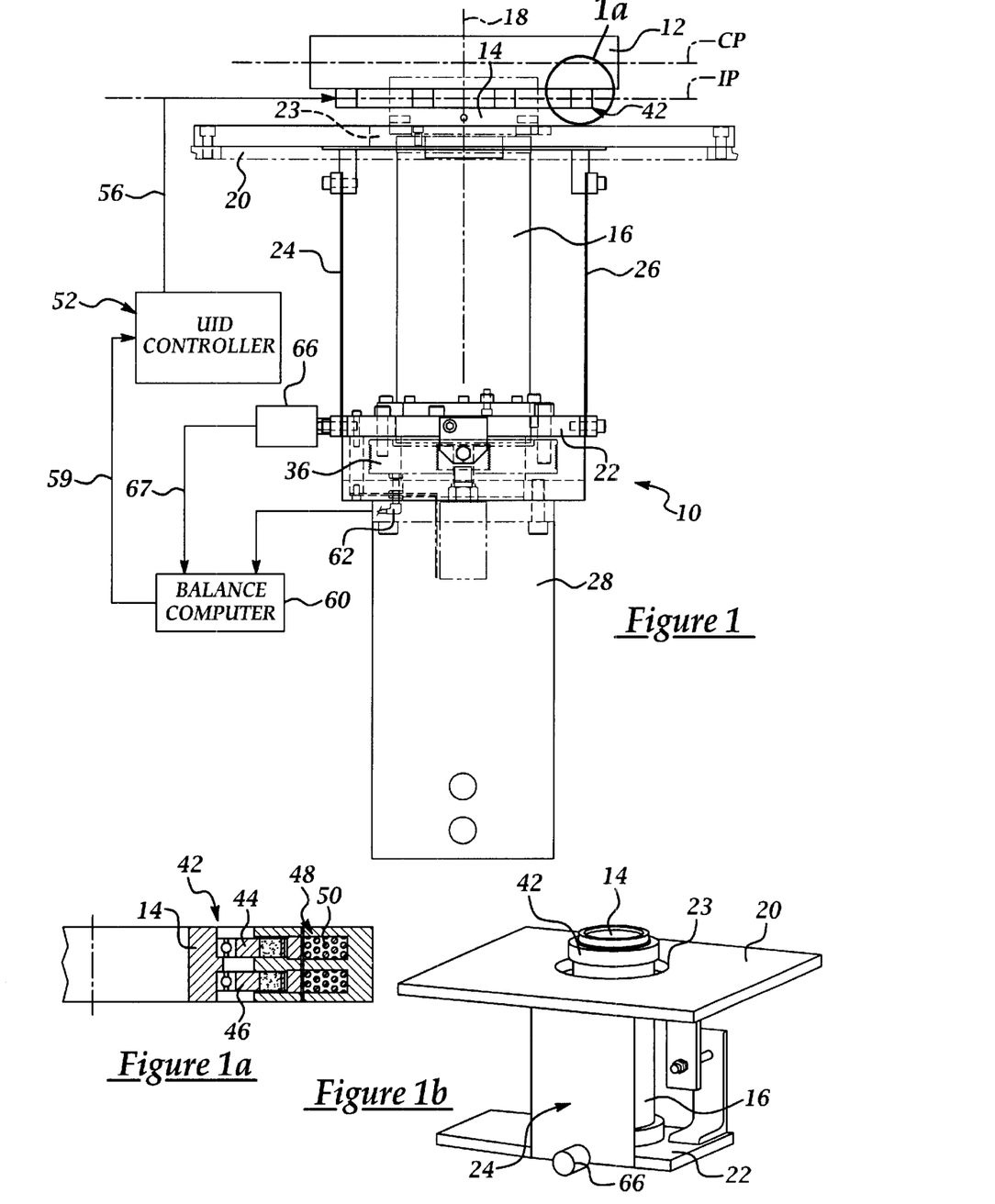
FIG. 1 is a side view of a balancing machine along with a diagram of a balance computer operatively connected thereto illustrating one embodiment of the invention.
FIG. 1a is an enlargement of the encircled portion 1a of FIG. 1 illustrating parts of an unbalance injector device utilized in this invention.
FIG. 1b is a pictorial view of part of the balancing machine of FIG. 1
Figure 2:
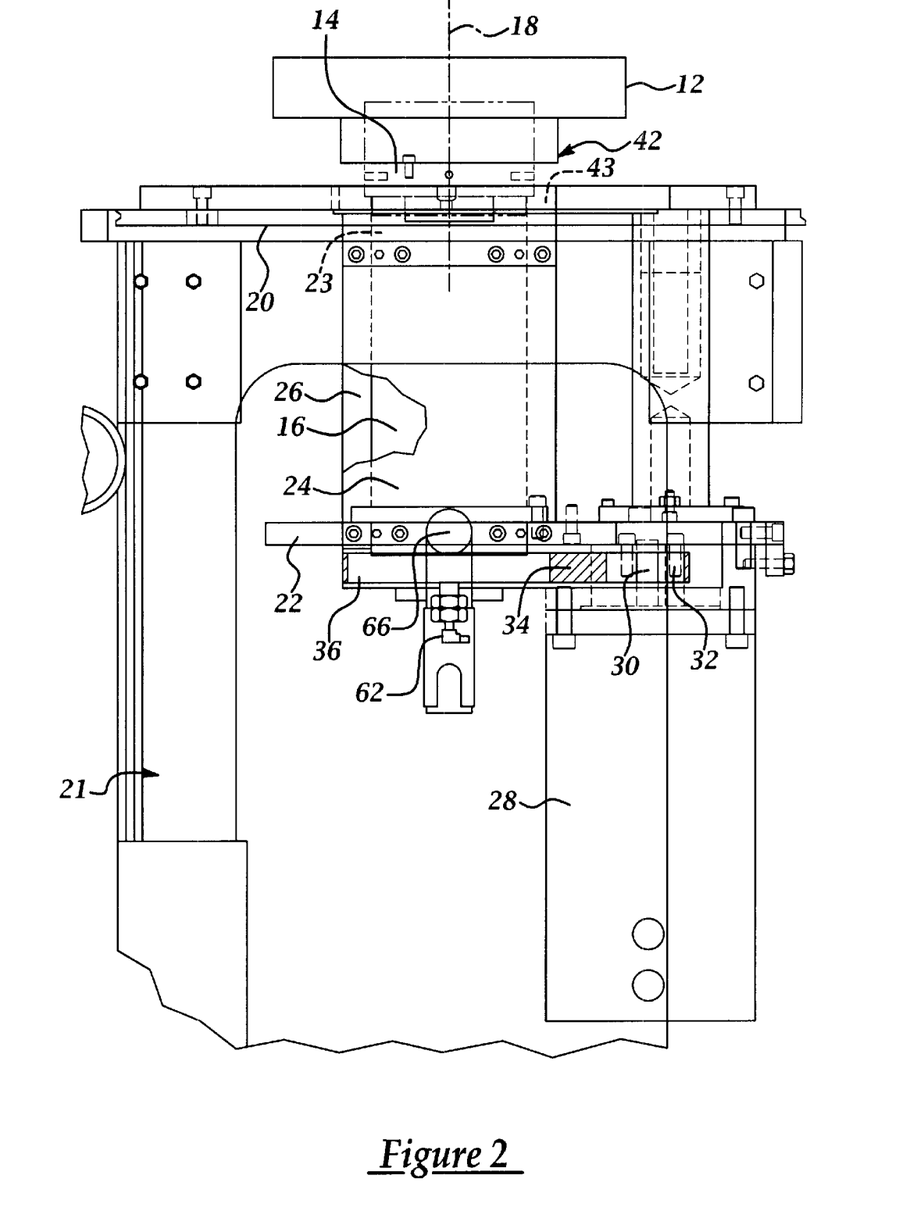
FIG. 2 is a front view of the balancing machine of FIG. 1.
Figure 3:
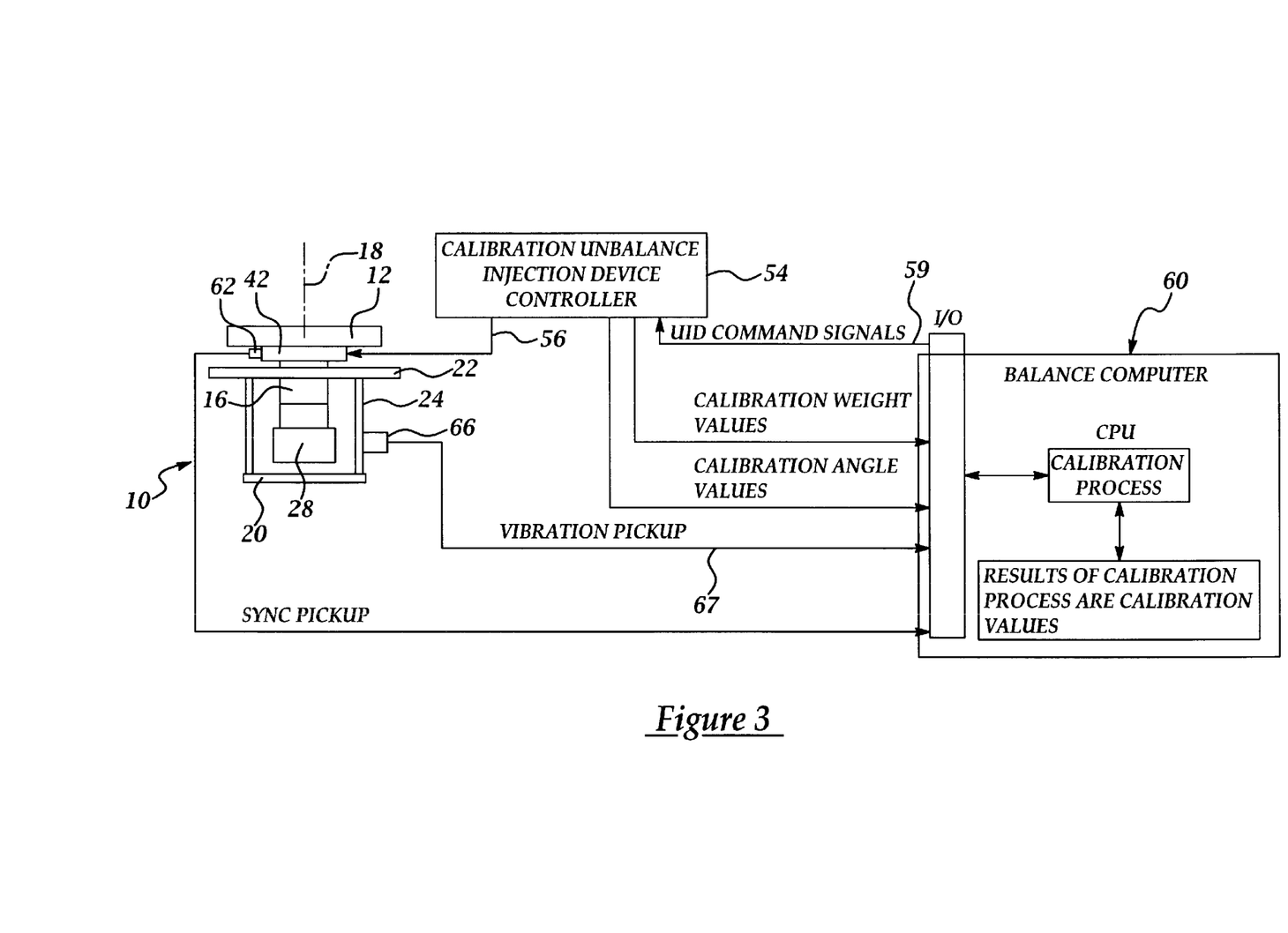
FIG. 3 is a schematic diagram of the embodiment of the invention illustrated n FIGS. 1 and 2.

Turning now in detail to the drawings there is illustrated in FIGS. 1 through 3, a single plane balancing machine 10 for spinning and dynamically balancing a rotatable drum or other work piece 12. The work piece 12 is securely mounted on a work piece holding unit or chuck 14 operatively mounted to and forming an extension of a cylindrical spindle 16. For machine calibration, the workpiece 12 is a known standard work piece or a balanced master into which a known unbalancing force is injected as will be further explained below.

The spindle, work piece holding unit, and any master or work piece mounted thereon are accordingly supported for unitized rotation about a spin axis 18 by upper and lower spindle mounting brackets or plates 20,22 vertically spaced from one another. The upper plate may be fixed to a stationary support 21 and have a centralized annular hole 23 therein through which the spindle extends. The lower plate is operatively connected mounted to the upper plate by a pair of flat supporting suspension springs 24, 26, laterally spaced from each other. The spindle mounting is accordingly resilient and the work piece 12 and the spindle and mount exhibit significant vibration when the unbalanced work piece is rotatable driven.

Torque for the rotational drive of the spindle and the components mounted thereon is provided by a selectively energizable electric motor 28 that is secured to the plate 22 or other suitable mounting. The motor has an upwardly extending and rotatable output shaft 30. This shaft has a drive pulley 32 fixed thereto that operatively receives an endless drive belt 34 which extends laterally and around a driven pulley 36. Pulley 36 is fixed to the lower end of the cylindrical spindle 16 just below the lower support plate 22. With this arrangement, power is readily transferred from the motor to the spindle for the rotational drive of the work piece 12 about spin axis 18.

In addition to the work piece holder, the spindle operatively mounts an unbalance injector device 42 operatively associated with the machine which can be set to inject predetermined unbalancing loads into the rotating standard or master work piece 12 for calibrating the work piece balancing machine 10. The unbalance injector device 42 may be a balancing unit such as one capable of injecting balancing loads into rotating tools for tool balancing purposes, a milling or drilling tool for example.

Among the commercial units, that can be utilized in this invention to inject loads into the work piece 12 are balancing units such as the EM 2000 high speed balancer or others supplied by BalaDyne Corporation, 1665 Highland Drive, Ann Arbor, Mich. 48108. and the automatic balancing system SBS or the SB-4500 balancer supplied by Schmitt Industries, Inc. 2765 NW Nicolai St Portland Oreg. 95210. U.S. Pat. No. 5,757,662 issued May 26, 1998 to S. W. Dyer et al for Electromagnetically Actuated Rotating Machine Unbalance Compensator, hereby incorporated by reference, discloses a balancing unit and electronic controls that may be readily integrated into the balancing machine and methods of this invention.

In any event, the unbalance injector device 42 may have a pair of interior counter-weight rings 44,46 see FIG. 1a, operatively mounted to a rotatable upper, axially-extending shaft portion of the spindle or to the rotatable workpiece holding unit 14 of the spindle. The unbalance force injection unit further comprises a driver 48 having a coil assembly 50 gapped from and disposed outwardly of the rings 44,46 that mounts to a housing of the spindle or other stationary component 52.

As applied to the present invention when a predetermined unbalancing load is required for calibrating purposes, electronic controller 54 best diagrammatically illustrated in FIG. 3 and operatively connected to the coil assembly by line 56 are activated by the balance computer to initiate load injections on signals transmitted from a balance computer 60 through line 59 connecting the controller to the balance computer. The controls 54 are accordingly operative to send power pulses to the coil assembly of the driver 48 of the unbalance injector device and effect the electromagnetic rotational stepping of the counter-weight rings 44, 46 to different predetermined rotary positions. Rotation of the rings to different preestablished positions results in the application or injection of a predetermined imbalance load into a base or injection plane IP extending through the work piece holding end of the spindle.

For machine calibration, the known unbalancing load is translated from the rotating spindle of the machine to the attached rotating master work piece 12 and particularly to a location on the master that is in a predetermined calibration or correction plane CP. This calibration plane extends thorough the master at a set distance from the base or injection plane and is parallel thereto.

The unbalance injector device 42 of the embodiment of FIGS. 1–3 is adjusted and set by the controller to automatically inject the predetermined unbalancing load into the spindle or chuck of the machine when the machine drives the work piece to a predetermined rpm. This unbalancing load is subsequently injected into the work piece 12 as a transversely oriented load and in the transverse calibration or correction plane extending therethrough for calibration proposes. This known unbalancing load is physically applied to the rotating workpiece holding component of the machine by the displaced rings 44,46 of the rotating components of the unbalance injection device and by translation to the workpiece 12 in the predetermined correction plane CP thereof.

While the unbalancing load is physically applied to the spindle and work piece holding device through base or injection plane IP extending therethrough, the calculated resulting imbalance force from unit 42 is linearly displaced to the predetermined calibrating or correction plane CP extending through the work piece at an offset location outboard of the injection or base plane IP. In a single plane balancing operation, the applied unbalancing load and the resulting injector force are equal.

As diagrammatically illustrated in FIGS. 1 and 3, the work piece balancing machine 10 has a balance computer 60 associated therewith which is programmed to effect the calculations necessary to effect the balancing of work pieces being processed by the machine 10. The balancing computer is calibrated with the functional work piece imbalance positional signals from a synchronizer pick up 62 positioned adjacent the work piece holder unit 14 or the work piece itself. Additionally electrical signals generated by unbalanced work piece vibrations are fed into the balance computer 60 from a vibration pick up 66 that is operatively connected to one of the support springs such as spring 24 or other suitable vibrating support forming part of the machine and connected to the balance computer 60 by lead 67 as diagrammatically illustrated in FIG. 3.

For machine startup operation, an operator preferably calibrates the machine by installing a known standard or masterwork piece on the machine 10 and energizes the balance computer and controller for automatic calibration. The machine rotatably drives the standard to a predetermined balancing speed and a minimized unbalance load, programmed into the controller, is injected into the standard work piece. Positional and known unbalance data resulting from the minimized load injection into the rotating master or other work piece mounting unit are recorded by the synchronizer and vibration pick ups and fed to the balance computer where such data is stored in the memory to calibrate to such imbalance. In the next run, the unbalance injection device is ordered to apply a predetermined unbalancing calibration load into the system and the results are again fed to the balance computer. The difference between the two readings taken from the unbalance pickups is the gain of the system.

Optionally for further calibration to compensate for the unbalance in the spindle and eccentricity of the part relative to the rotational axis of the spindle, additional steps are taken. This includes the stopping of the machine so that the operator can disengage the work piece and rotate the work piece on its rotational axis and relative to the workpiece holding chuck 14 a predetermined number of degrees, 180 for example. The work piece is then reattached to the machine chuck for the rotational drive thereby and ramped to a predetermined speed. The unbalancing injection device is activated to again inject a minimized unbalancing load into the work piece as previously described. The unbalancing calibration load is then injected and the final reading are taken and sent to the balancing computer for finalizing the calibration thereof.

After such calibration is completed, unbalanced work pieces can be quickly loaded one after the other and spun to balancing speeds whereby the calibrated balance computer can calculate the particular imbalance of the work piece being processed and effect the precise correction thereof with appropriate weight position and the quantity of weight adjustment in the balancing planes thereof.

Double Plane Balancing

Figure 4:
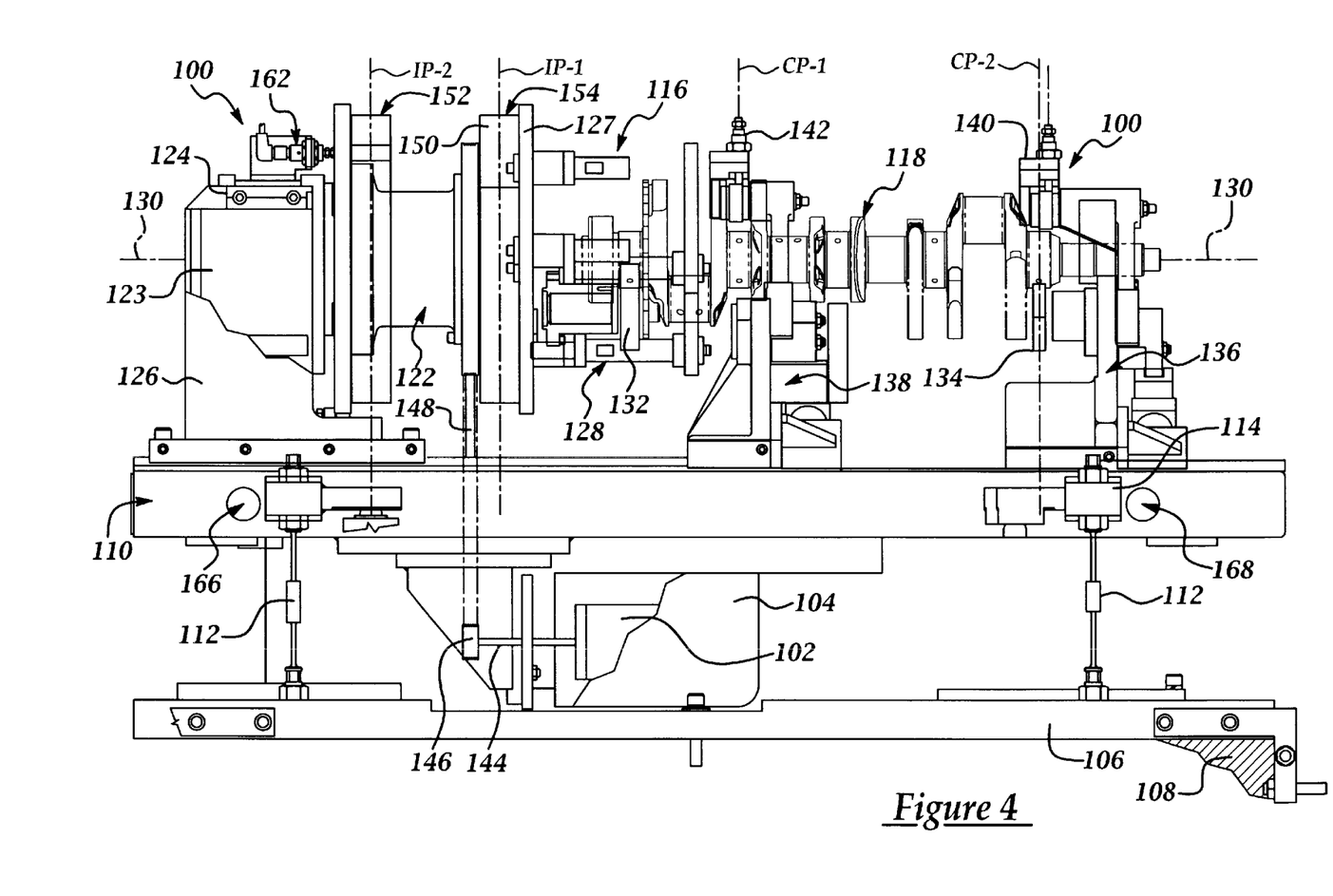
FIG. 4 is a front view of another preferred embodiment of the invention.
Figure 5:
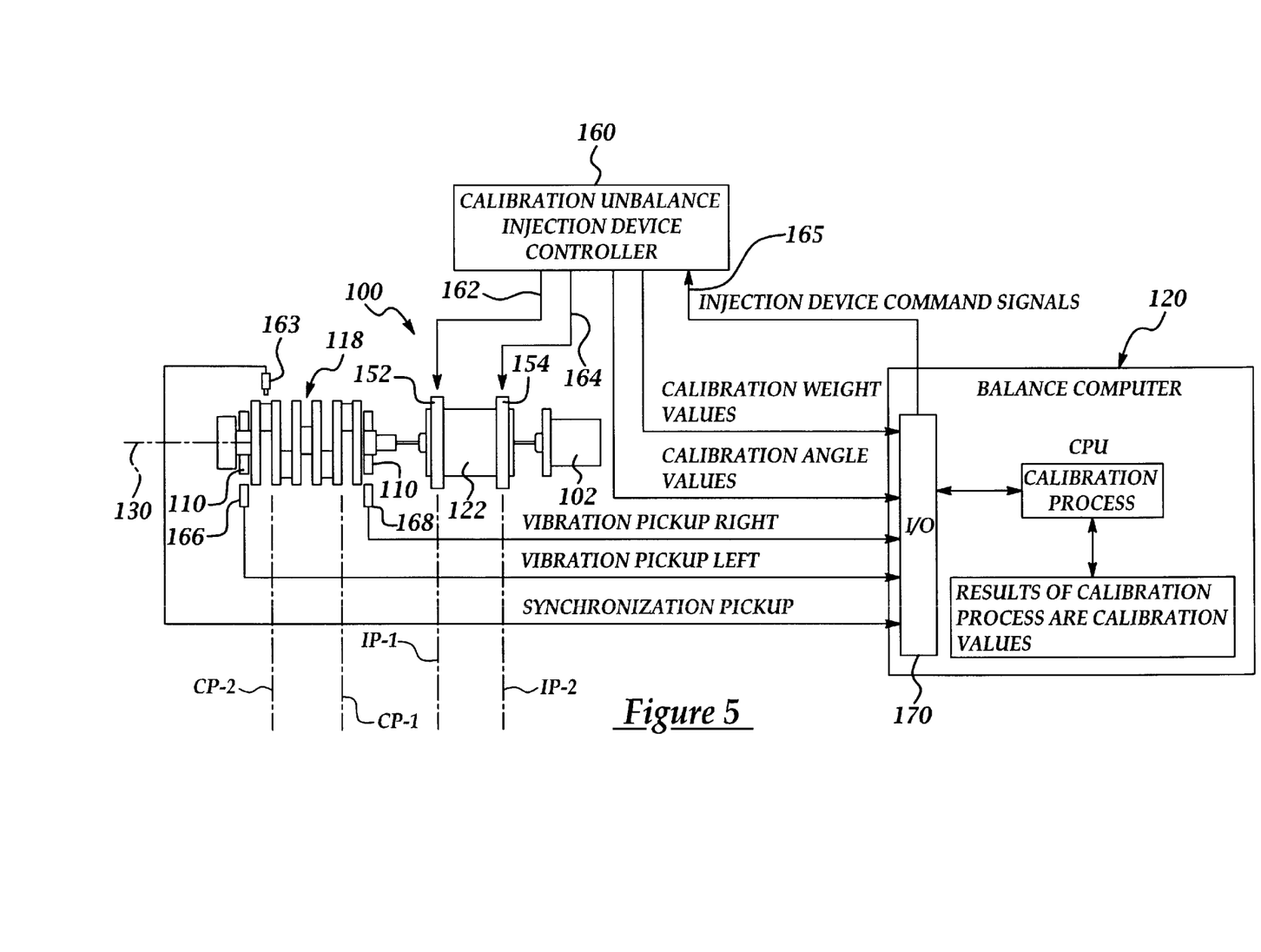
FIG. 5 is a schematic diagram illustrative of the embodiment of the invention of FIG. 4.
Figure 6A:
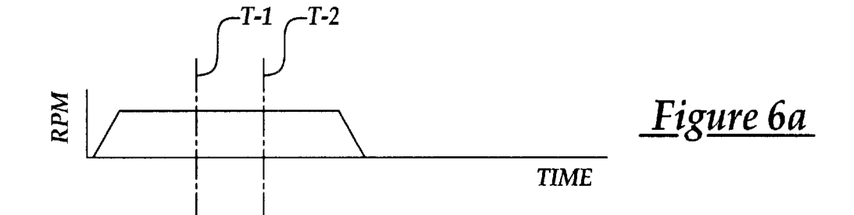
FIGS. 6a, 6b and 6c are interrelated curves illustrating self calibration operations of a work piece balancing machine according to this invention.
Figure 6B:
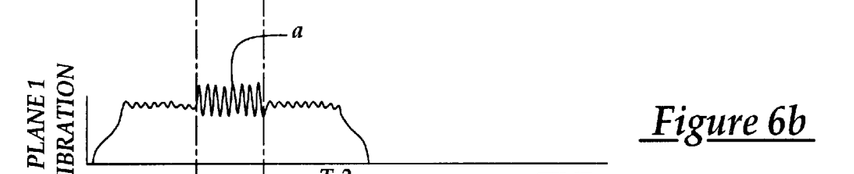
Figure 6C:
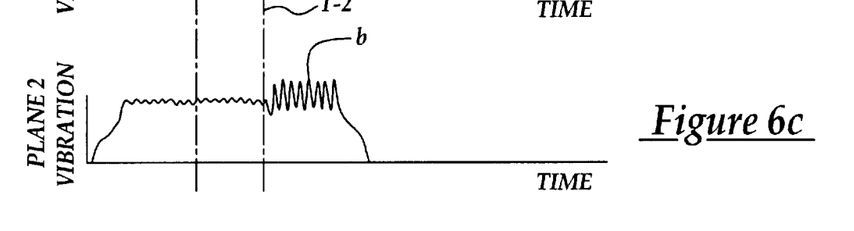

FIGS. 4–6 illustrate another preferred embodiment of the invention that carries forward principles of the embodiment of FIGS. 1–3. Primarily they share in the aspect directed to the automated injection of predetermined unbalancing loads into a load injection plane utilizing unbalance injector device while the workpiece holding device is spinning a known standard or master work piece at a predetermined rotational speed. This injection of known unbalancing force into the machine such as the work piece holding chuck thereof results in a corresponding unbalancing force being injected into the master work piece being driven by the machine and in a predetermined correction plane thereof. Data from the resulting workpiece imbalance vibrations and the corresponding eccentricity the unbalanced master or standard is supplied to the balancing computer for the calibration thereof.

However, the machine of FIGS. 1–3 can not precisely balance elongated work pieces, such as mass produced propeller or crank shafts or other units, whose principal inertia axes are not parallel to their associated axes of rotation. This non-parallel relationship of the inertia and rotational axes in such parts is known as dynamic unbalance. Correction of unbalances such as dynamic unbalance in an elongated work piece requires the addition of two weights to the work piece and in two separate and spaced-apart correction planes so that other machines and process steps are needed and their associated balancing computers need to be calibrated.

In the construction of FIGS. 4–5, a balancing machine 100 capable of balancing such elongated work pieces provided. This machine has an electric or otherwise powered drive motor 102 which is operatively mounted in a housing 104 supported on a generally rectilinear lower base plate 106 in turn secured to a floor or other fixed support 108. The machine has a cradle 110 resiliently supported by four vertically extending corner suspension spring units 112 extending upwardly from attachment with the base plate 106. The upper ends of these spring units adjustably mount into threaded adjustment fittings 114 secured to the sides of the cradle, for cradle leveling or positioning purposes. Moreover, with this resilient suspension spring construction the cradle, the work piece-spinning sub-assembly 116 operatively mounted thereon as well as the work piece, here in the form of a master or known standard engine crank shaft 118 operatively mounted therein experience significant vibrations from work piece imbalances.

As in the embodiment of FIGS. 1–3, data from such vibrations and the location of injected imbalance loads are supplied to the balance computer 120 of the machine for calibration purposes as will be explained hereinafter.

The work piece spinning equipment or sub-assembly 116 equipment includes a horizontally extending spindle 122 having its cylindrical outboard end 123 mounted for rotation in a bearing assembly 124 secured in a supporting end housing 126 that extends upwardly from attachment with the cradle 110. The inboard end 127 of the spindle mounts a hook drive 128, which drivingly fits onto the adjacent end of the crankshaft 118, which for calibrating purposes is a master or known standard crankshaft as previously indicated. As shown the master crankshaft 118 is supported for rotation in the machine about a horizontal spin axis 130 by suitable bearings such as a front roller bearing 132 secured to a stationary part of the spindle or other component and by a rear roller bearing operatively mounted on upright 136. Additional support is provided by upright 138. The uprights 136 and 138 are securely attached by their bases to cradle 110 by appropriate fastener devices that provide for the adjustment of the uprights to accommodate work pieces of different lengths and other configurations Upper clamping retainers 140, 142 operatively mounted on the stationary uprights 136 and 138 have bottom rollers which contact main bearing surfaces of the crankshaft to operatively retain it in the spinning equipment of the machine.

The crank shaft 118 is rotatably driven about the axis 130 by the motor 102 which has a rotatable output shaft 144 having a pulley 146 operatively mounted on the end thereof which accommodates and drives an endless drive belt 148 which loops around a spindle drive pulley 150 that is drivingly secured at its inner diameter to the spindle 122.

In addition to the drive pulley 150, the spindle 122 operatively mounts left and right side unbalance injection devices 152, and 154. Each of these devices is substantially the same in construction as the unbalance injection device 42 of the machine of FIGS. 1–3. Each device 152, 154 may comprise a pair of interior counterweight rings operatively mounted in side by side relationship. These rings have known imbalance loads so that they can be rotated to different angular positions to effect the loading of the spindle with predetermined imbalancing loads for calibration purposes.

Moreover, as in the previous embodiment the counterweight rings are actuated by a driver such as a surrounding coil disposed outwardly of the pair of rings. The coil is secured in an outer housing that may be fastened to a stationary housing or other component of the machine. The unbalancing injector devices 152,154 are supplied with injector command signals from a controller 160 through lines 162 and 164 diagrammatically shown in FIG. 5. The controller 160 operates automatically on command signals from the balance computer through signal line 165. Accordingly, the unbalance injector devices are selectively operative on computer command to serially inject unbalance loads into the machine driving the master workpiece in the laterally spaced injection planes IP-1 and IP-2. These unbalancing loads are translated to the correction planes CP-1 and CP-2 of the workpiece respectively to effect the establishment of inertia axis that is not parallel to the spin axis of the crankshaft. A known imbalance is created in the master, which will be used for calibration of the machine As in the previous embodiment, the balance computer 120 is operationally utilized to determine the specifics of the imbalance in unbalanced work pieces to be processed in the machine 100. The balance computer 120 is supplied with imbalance positional data of a workpiece from the synchronizer pickup 162 communicating with the balance computer 120 by data line 163. However, because the master being used for calibration purposes is eccentrically loaded by the imbalance injector device in the two correction planes its inertia axis does not align with the centerline or rotational axis 130. Consequently, a known dynamic imbalance is created in the master. This imbalance generates vibrations of particular amplitudes recorded by left and right side unbalance vibration pick-ups 166 and 168. These pick-ups are operatively mounted with respect to the reiliently sprung cradle to receive vibration inputs therefrom. Picks up signals resulting from these vibrations are sent to the input/output board 170 of the balance computer 120.

For calibrating purposes, the rotationally balanced master or a standard work piece 118 with known imbalances and other physical measurements and characteristics, which is operatively loaded into the machine as by the machine operator or an automatic loader so that the hook drive 128 drivingly engages the drive end of the master crankshaft. Then the operator simply starts the calibration drive by a suitable control such as a push button. Base line reading with minimized load injections are taken and stored in the computer memory as in the previous embodiment of FIGS. 1–3. After this the machine accelerates the part to a balancing speed and without stopping serially injects the unbalancing loads into the master or standard in the two horizontally spaced correction planes thereof and the data reflective of these unbalancing loads are automatically sent by operation of the synchronizer and vibration pick ups to the balance computer for the self-calibration thereof.

FIGS. 6a, 6b and 6c depict the known load injection and self-calibration operation of the balancing machine and methods of the embodiments of FIGS. 4 and 5. More particularly FIG. 6a shows the continuous and constant rotational speed of the motor and the master or standard work piece 118 driven by the machine. As an example during the initial third of the operation, both of the unbalance injector devices 152 and 154 are in a return or home position. FIG. 6b illustrates the calibrating position of the unbalance injector device 152 at time T-1 by signals from the controller 160 as required by the balance computer 120. This first load injection into the injection plane IP-1 and translated to calibrating plane CP-1 results in increased amplitude of plane 1 or calibrating plane CP-1 vibrations "a" which are picked up by the vibration sensor 166. At a subsequent time T-2 for example, the balancing computer 120 directs the unbalance device controller 160 to return the unbalance injection device 152 to home and simultaneously effect the calibration operation of unbalancing injection device 154. As shown in FIGS. 6c this results in the reduction of plane 1 vibration amplitude and an increase in the plane 2 amplitude of the vibrations "b" from the injection of the calibrating load into the work piece in plane 2 or calibrating plane CP-2.

Figure 7A:
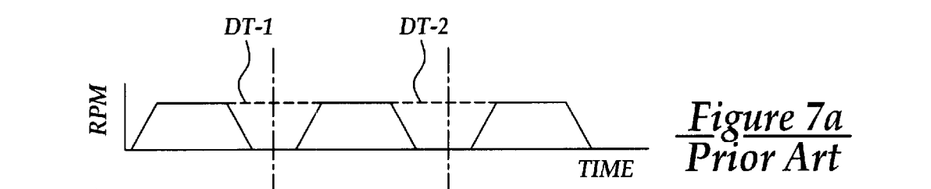
FIGS. 7a, 7b and 7c are interrelated curves illustrating a prior art process of manually calibrating of a work piece balancing machine.
Figure 7B:
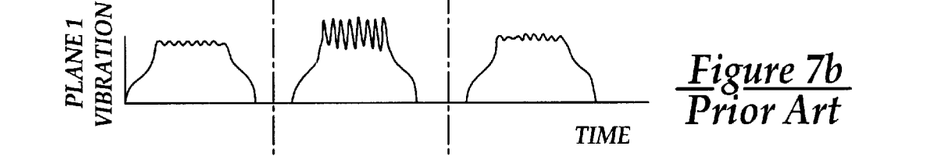
Figure 7C:
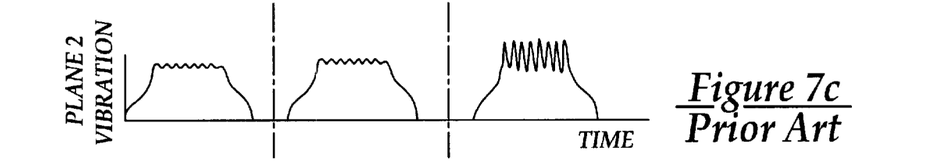

This staged increased amplitude of vibrations in planes 1 and 2 resulting from the serial injection of known calibration loads into the spindle of the machine is translated to the workpiece in calibrating planes CP-1 and CP-2. These timed injections are diagrammatically represented by the large amplitude signals "a" and "b" for each revolution. Data representative of the known unbalances and their sites of insertion are supplied to the balance computer for the initial calibration thereof. These calibrating load injections take place without machine stoppage as previously described, FIGS. 7a, 7b and 7c are graphical representation of the calibration operation of a prior art workpiece-balancing machine that requires manual calibration and are presented for comparison with the corresponding calibration of the machine of this invention, FIGS. 6a, 6b and 6c. The time intervals DT-1 and DT-2 shown as dashed lines between the curves of FIGS. 7a represent prior art machine down times for stopping and starting the machine and for the hands on activity of the operator for manually adding and subtracting calibration weights to the master or standard. Such down times are eliminated in automatic two-plane calibration of the present invention. This demonstrates the material improvement in the machine and efficiency of this invention over the prior art. Moreover, these new processes and machines sharply eliminate the opportunity for operator error and materially reduces calibration burden.

Figure 8:
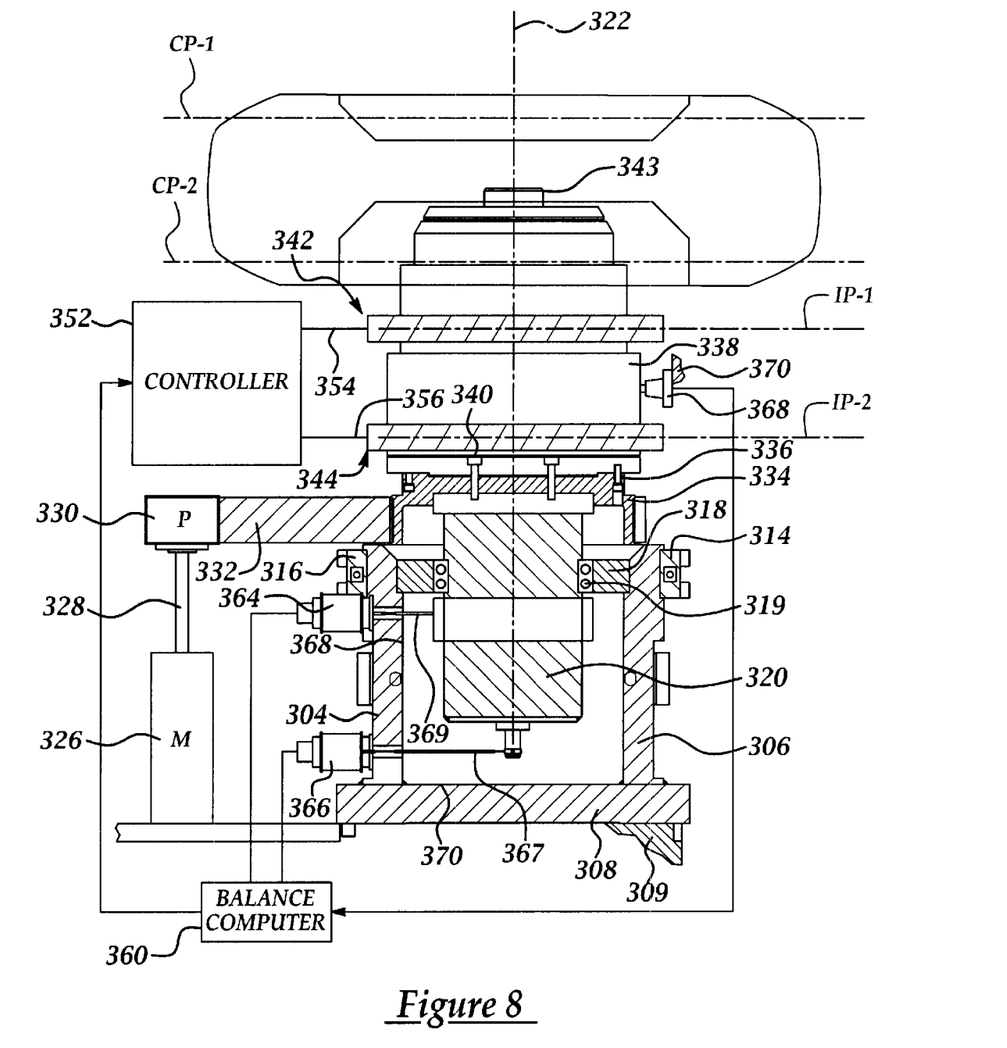
FIG. 8 is a side view of another preferred embodiment of this invention.
Figure 8A:
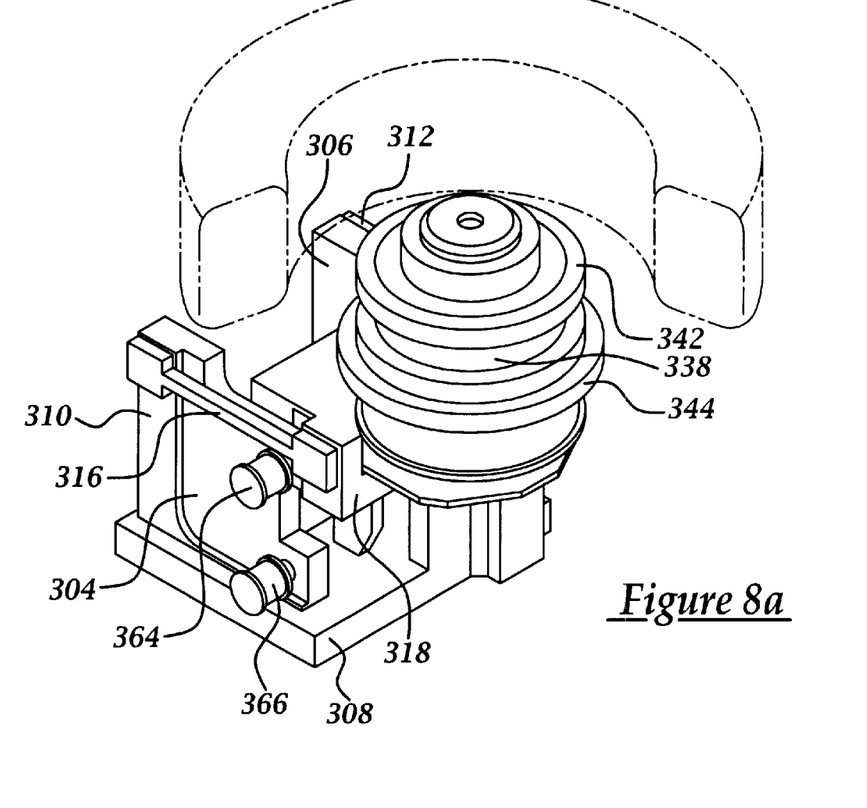
FIG. 8a is a pictorial view of the FIG. 8 embodiment of the invention.

Turning now to FIG. 8, there is illustrated another two plane dynamic balancing machine 300 that features self-calibration similar to that of the machines and processes of FIGS. 1–3 and 4–6. The machine 300 has a pair of laterally spaced support walls 304 and 306 that extend upwardly from base plate 308 that securely mounts to the floor 309 or other stationary support. The walls 304 and 306 have enlarged and upstanding rear portions 310 and 312 that provide end support for a pair of laterally spaced and forwardly-extending, spring suspension arms 314 and 316. The forward ends of these spring suspension arms attach to a cradle unit 318 operatively mounted thereto which has suitable bearings such as ball races 319 that support a spindle assembly 320 therein for rotation about a vertical spin axis 322. Additionally the base plate 308 supports a servo unit such as an electric or hydraulic drive motor 326 thereon which has an upwardly extending output shaft 328 that rotatably drives a pulley 330 on the distal end thereof that receives and drives an endless drive belt 332 which loops around and drives a chuck drive pulley 334. The pulley 334 is drivingly secured by threaded fasteners 336 to a chuck assembly 338 supported by the spindle assembly. More particularly the chuck assembly 338 extends upwardly from attachment with the upper end of the spindle assembly 320 by threaded fasteners 340 so that it rotates about the spin axis 322. The chuck further has a pneumatically actuated collet 343 that is operable in the releasable attachment of a road wheel assembly 344 to the chuck 338.

Figure 8B:
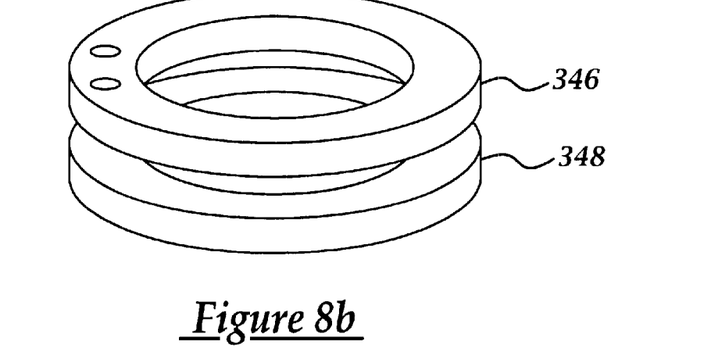
FIG. 8b is a pictorial view of one pair of balancing rings used in the FIG. 8 embodiment of this invention.

The chuck assembly 338 further operatively carries a pair of spaced unbalancing injector devices, 342 and 344 which have construction such as described about the embodiments of FIGS. 1–3 and FIGS. 4–6. More particularly these unbalance injector devices 342, 344 may each have a pair of weighted rings 346,348 pictorially illustrated in FIG. 8b operatively mounted to the spindle. As in the previous embodiments these devices may have an outer driver such as a selectively energized coil separated by an air gap and outwardly of the rings. The driver as in prior embodiments is attached to a fixed housing not shown. This coil is operatively connected to a controller 352 through leads 354 and 356 that is operable to effect energization of the coil to step the rings to different predetermined positions on the chuck 338 and relative to one another to effect the injection of different and predetermined unbalancing loads to the spindle for calibration purposes.

The wheel assembly 344 although a master for calibration purposes has two vertically spaced correction planes CP-1 and CP-2 assigned there to since its inertia axis will be changed by known weight application in each of these planes so as to be out of parallel with respect to the spin axis 322.

As in the preceding embodiments, this embodiment of the invention has a balance computer 360 associated therewith which is employed to receive data from vibration pick up units 364 and 366 whose housings are mounted to the walls 304 of the frame 302. These units receive vibration signals from the elongated pick-up rods 367, 369 extending from the pick-up devices into operative engagement with the spindle 320 or other suitable vibrating component of the machine. In addition to the vibration pick-up units 364, 366, a synchronizer or once-per-turn pick up 368 is mounted to a fixed housing or wall 370 adjacent to the chuck 338 and is operative to deliver signals to the balance computer 360 with positional data regarding the imbalance loads so that effective balancing weight can be applied to precise positions in the correction planes of the wheel assembly to effect the balancing thereof The balance computer communicates with the controller 352 through signal line 372 so that the controller timely injects the predetermined unbalancing loads into the injection planes extending through the spindle of the balancing machine.

Figure 9:
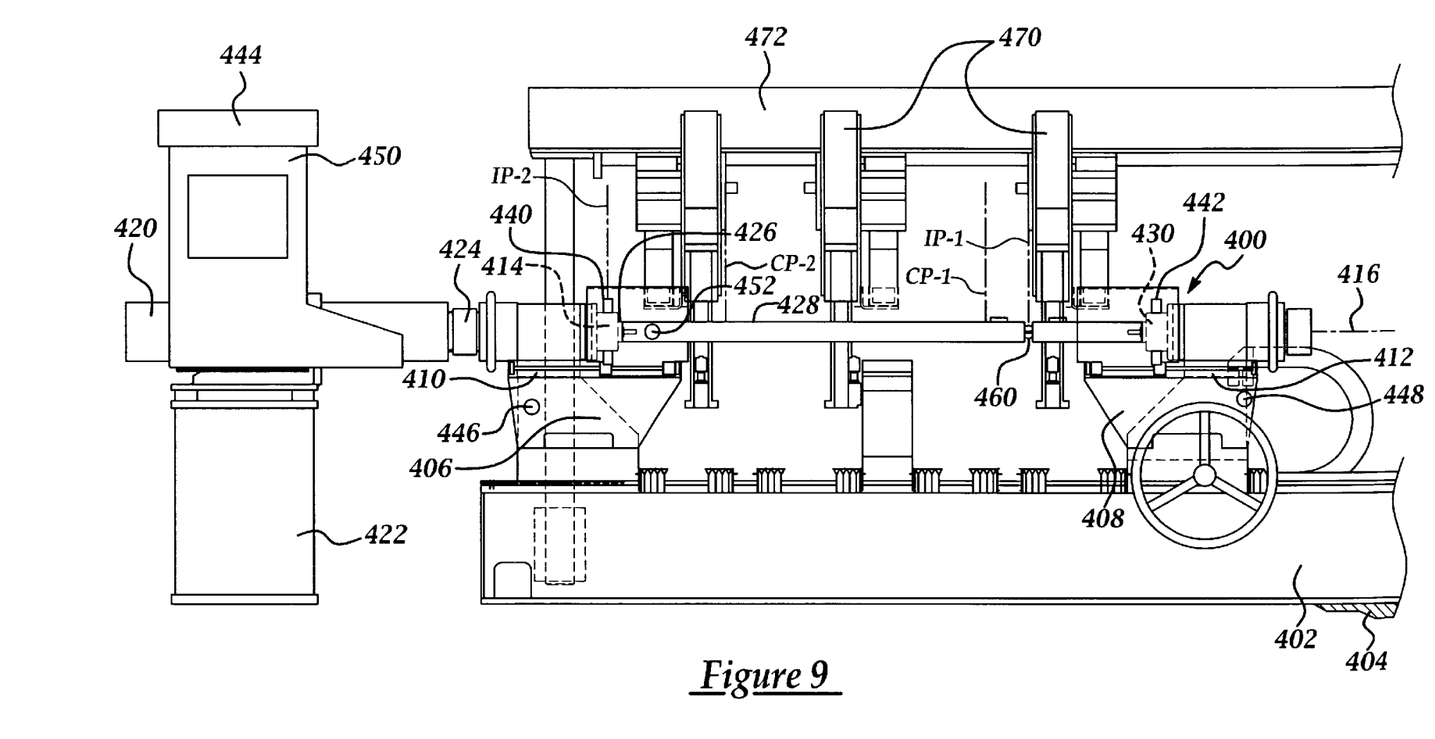
FIG. 9 is a front view of still another preferred embodiment of this invention.

The balance computer 360 of the machine is precisely and efficiently calibrated relative to known imbalances for the optimized dynamic balancing of unbalanced parts. This is accomplished by the employment of programmed unbalancing load injector devices, 342 and 344, which may be substantially the same as the pair of units of the FIGS. 4, 5 and 6. The load injectors, operatively mounted to the spindle assembly, are signaled by controller 352 to serially inject unbalancing loads into the spindle assembly in injection planes IP-1 and IP-2 for calibration purposes. These planes respectively extend transversely though the load injector units and the spin axis 322 and are parallel to the correction planes CP-1 and CP-2 to which these loads are translated as described in connection with the two plane balancing of FIGS. 4, 5 and 6. As with the other two plane balancing embodiment of this invention, signals from the known imbalance loads and their locations are picked up by the vibration sensors or velocity transducers 364,366 and synchronizer 368 and sent to the balance computer 360. This calibrating data recognized by the balancing computer is stored in memory thereof so that subsequent unbalanced wheel assemblies can be balanced by machine 300 with optimized accuracy FIG. 9 depicts a propeller or prop shaft balancing machine 400 that is self-calibrating as in the other embodiments. The machine 400 has a base 402 mounted to a support such as floor 404. The machine further comprises pairs of horizontally spaced suspension spring units 406 and 408 that extend upward from connection with the base into connection with left and right side cradles 410 and 412. The left side cradle supports an outer housing fixed thereto that operatively mounts a cylindrical spindle 414 therein for rotation about a horizontal spin axis 416. The spindle is rotatably driven by an electric or hydraulic motor 420 supported on a base 422. The motor has a rotatable output connected by coupling 424 to the outer end of the spindle 414. The inboard end of the spindle has a chuck 426 operatively mounted thereto which is adjustable to operatively receive the end of an elongated master or known propshaft 428 thereto for the rotational drive of the propshaft about axis 416. The aft end of the propshaft is secured into a right side chuck 430 that in turn is mounted to the end of a spindle 432 supported by a housing 436 secured on cradle 408 of the right side suspension.

Importantly the chucks have unbalance injection devices 440 and 442 operatively mounted thereon which like the embodiment of FIGS. 4-6 and 8 are operable under command of a controller 444 to be selectively energizable to inject unbalance loads into the propshaft for calibration purposes as in the previous embodiments. Vibration pick-ups 446 and 448 are operatively mounted to the left and right side spring suspensions 406 and 408 which are subjected to the vibratory energy of left and right side imbalance loads as in the previous embodiments. Data from the injected loads are delivered to a balance computer 450 by feeds from the vibration pick-ups 446 and 448. A once per turn pick-up or synchronizer 452 provides the positional data of the imbalance loads which are fed to the balance computer 450 for calibration thereof.

The prop shaft of FIG. 9 has a universal, constant velocity, or other connector-joint 460 therein. With such constructions, the injection plane of the unbalance injector device 434 will be in plane IP-1 and transversely through the joint 460, which is translated to correction plane through the master workpiece and calibration plane CP-1 for calibration purposes. In contrast, the imbalance load injection of the unbalance injector device 440 will be through the IP-2 extending through the device 440 and the chuck 426 which is translated from the machine spindle to correction plane CP-2 that extends through the prop shaft for purposes of calibration as in the preceding embodiments.

Diagrammatically illustrated are weight welding units 470 which are operatively supported by overhead gantry 472 for welding balancing weights to the prop shaft in accordance with dynamic balancing data from the balancing computer. The weight welder provision may however be automated in manner disclosed in copending U.S. application Ser. No. 10/121,533 filed Apr. 12, 2002 by P. Loetzner, P Hemingray and C. Maas for Rotatable Shaft Balancing Machine and Method assigned to the assignee of this invention and hereby incorporated by reference In the FIG. 9 embodiment of this invention, an unbalanced production part can be used for the calibration of the machine 400 with some modification of the above process or method that involves stopping of the machine. For such variation, the machine is stopped once to reorient the part in the machine. No down time is required for changing the calibration weights. To begin such modified calibration, a normal production part such as those formed by process machines is randomly selected and placed into the machine 400 for the rotational drive thereby. The machine is started and the selected workpiece is rotationally accelerated to a calibrating speed. At this time, the known imbalance loads are serially inject into the rotating workplace in the separate correction planes and the machine automatically calibrates itself as previously described.

The operator then stops the machine 400, rotates the production part 180 degrees on its spin axis, and reconnects the part to the drive chuck or other drive. The machine is again started and to rotatably drive the selected part to a balancing speed. The calibration weights are again automatically and serially injected into the two correction planes. Again the vibrations resulting from these subsequent known unbalancing loads and positional signals from the synchronizer are picked up and the calibration data therefrom are directed to and stored in the associated computer so that subsequent unbalanced propshafts can be accurately balanced by the machine 400.

While this invention has been described in terms of certain preferred embodiments and methods thereof, it will be appreciated that other forms and methods could readily be adapted by one skilled in the art. Accordingly, the scope of this invention is to be considered limited only by the following claims.

What is claimed is:

1. A work piece balancing machine operable to rotate and dynamically balance interchangeable and rotationally unbalanced work pieces when operatively mounted therein and being further operable to self calibrate when a specific work piece as a calibrating standard work piece is operatively mounted therein comprising, a rotatable drive spindle and work piece holding unit for the attachment and rotation of a work piece about an axis of revolution, a resilient support for said rotatable drive spindle and work piece holding unit, a balance computer for calculating a balance weight quantity and a position of weight attachment to the work piece to effect the dynamic balancing of said work piece, signal pick up units operatively connected to said computer for picking up inputs from said machine generated by an unbalanced work piece mounted in and rotatably driven by said machine and for delivering such inputs to said balance computer with unbalance data from said rotating work piece that allows the computer to determine the location and the amount imbalance of the work piece, an adjustable unbalance force injecting device operatively mounted to said rotatable spindle and work piece holding unit which is selectively adjustable to apply a predetermined unbalance force to a specific work piece employed as a calibration standard operatively mounted in the machine through a predetermined balancing plane thereof after said calibrating standard work piece is loaded into the rotatable spindle and work piece holding unit and rotatably driven to a calibrating speed so that said signal pick up units supply said balance computer with unbalance data from said calibration standard to effect calibration of said balance computer, whereby said machine can be subsequently employed in an accurate rotational balancing of said interchangeable and rotationally unbalanced work pieces.

2. A work piece balancing machine operable to rotate and balance interchangeable and rotationally unbalanced work pieces operatively mounted therein and being further operable to self calibrate when a specific work piece as calibrating standard work piece is operatively mounted therein comprising, a rotatable work piece holding unit for the attachment and rotation of a work piece about an axis of revolution, a support for said rotatable work piece holding unit, a balance computer for calculating a balance weight quantity and a position of weight attachment to the work piece to effect the balancing of said work piece, vibration and synchronizer pick up units operatively connected to said computer for picking up inputs from said machine generated by an unbalanced work piece mounted in and rotatable driven by said machine and to deliver such inputs to said balance computer with data from said rotating work piece that allows the computer to determine the precise location and the precise amount imbalance of the work piece, an adjustable unbalance force injecting device operatively mounted to said work piece holding unit which is selectively adjustable to apply a predetermined unbalance force to a specific work piece as a calibration standard rotatably driven by the machine through a predetermined balancing plane thereof and there effect a known unbalance of the calibration standard and generate unbalance vibratory signals, said balance computer being operative to convert and store unbalance readings from said generated unbalance vibratory signals thereby calibrating said computer, whereby said machine can be subsequently employed in an accurate rotational balancing of said interchangeable and rotationally unbalanced work pieces.

3. A method of calibrating a work piece balancing machine having a work piece balancing computer, a rotatable drive spindle with a work piece holding device for gripping and rotatably driving a work piece held therein and further having an unbalance force injecting unit operatively associated with said rotatable spindle comprising the steps of:

operatively mounting a calibration standard work piece in the work piece holding device and rotatably driving the standard work piece about an axis of rotation to a predetermined balancing speed, employing the unbalance force injecting unit to inject a predetermined force into the standard work piece in a predetermined balance plane thereof to effect the rotational imbalance thereof, providing said balancing computer with data instructive of an amount and location of imbalance to effect the calibration of said balancing computer so that said balancing computer can subsequently accurately recognize unbalance data from interchangeable unbalanced work pieces being balanced in said machine to locate the precise points on the interchangeable work pieces where calculated weight should be varied for rotational balancing purposes.

4. A self-calibrating balancing machine selectively operable for (1) calculating a weight and weight position to effect a rotational balance of a number of interchangeable work pieces that need to be rotationally balanced and (2) self-calibration by the employment of a calibrating standard work piece comprising, rotatable spindle and work piece holding construction for receiving and holding said calibrating standard work piece for rotation about an axis when calibrating the machine for subsequent accurate measurement of rotational imbalance of rotationally unbalanced work pieces, support for said rotatable spindle and work piece holding construction, a balance computer operatively connected to said support and said work piece holding construction for determining an amount of weight adjustment and a location for such weight adjustment for the rotationally unbalanced work pieces operatively mounted in said machine, at least two discrete unbalance force injecting devices operatively associated with said rotatable spindle and work piece holding construction which are selectively operated to inject predetermined calibration loads into the calibrating standard in spaced calibration planes thereof to effect the rotational imbalance of the standard work piece, a controller for said unbalance force injection devices adapted to control the operation of said devices so that a number of different calibration forces of predetermined magnitudes can be injected into the standard work piece in the calibration planes thereof, pick up units for picking up synchronous signals from the rotating standard work piece reflective of position and amount of rotational imbalance injected into the standard work piece and feeding such signals into said balance computer for the calibration thereof whereby said balancing machine can be subsequently employed in a precise rotational balancing of any of said work pieces operatively loaded into said machine.

5. The self calibrating machine of claim 4 wherein said work piece holding construction comprises a pair of spindles and workpiece holding chucks spaced from one another and wherein said unbalanced work pieces are elongated shaft members and wherein said chucks are supported on spaced cradles and said support are resilient so that said rotationally unbalance work pieces vibrate from said injected predetermined calibration loads, and wherein said force injecting device comprise first and second separate units, a first of said units being operatively mounted on a first of said workpiece holding chucks and a second of said units being operatively mounted on a second of said workpiece holding chucks.

6. The machine of claim 4 wherein said unbalance injection devices each have a pair of relatively movable unbalancing rings and an electronic controller associated with said devices for effecting the relative movement of said rings to different relative positions for injecting known imbalancing loads into said machine for the calibration of said balance computer and a connection between said balance computer and said electronic controller so that said balance computer can signal said controller to effect the injection of predetermined imbalance loads into said calibrating standard workpiece.

7. A method of calibrating a work piece balancing machine having a balancing computer, a rotatable spindle with a work piece holding device for gripping and rotatable balancing a work piece, and at least two discrete unbalance force injecting devices operatively mounted on the rotatable spindle comprising the steps of, operatively mounting a standard work piece in the work piece holding device and rotatably driving the device and standard workpiece about an axis of rotation established by the machine, operating a first unbalance force injection device to inject a predetermined calibrating load to the standard work piece master in a first balancing plane thereof to effect a rotational imbalance thereof, as the standard work piece is being rotatably driven, effecting a first calibration of the machine and the balance computer with an unbalancing data resulting from the first force injection device so that the balancing computer can subsequently recognize the synchronization and vibration data signals from the rotating standard workpiece to thereby effect an initial calibration of the balancing computer, while the standard work piece is still being rotationally driven deactivating the first unbalance force injection device and activating a second force injecting device so that said second force injection device injects a predetermined injection load into the standard work piece in a second balancing plane spaced from the first balancing plane to effect the rotational imbalance of the standard work piece, again supplying said balancing computer with data from the synchronizing and vibration data signals to adjust and complete the calibration of the balancing computer.

8. A workpiece balancing machine that incorporates a balance computer and a workpiece holding unit for selectively gripping and spinning unbalanced workpieces to a predetermined balance speed about a spin axis so that said balancing computer can calculate a position and amount of weight adjustment needed for a dynamic balancing thereof, an unbalance injector device for injecting imbalance loads into an injection plane in the machine that is translated into a known calibrating workpiece in a predetermined correction plane extending through the known calibrating workpiece to effect the dynamic unbalance of the known calibrating workpiece that results in a vibratory excitement of the workpiece and of portions of the machine, and synchronizer and vibration pick up units operatively associated with the machine for receiving data regarding load and load insertion points imposed on said known calibrating workpiece and for supplying such data to said computer for the calibration thereof with respect to said data from said known unbalanced loads applied to said known calibrating workpiece.

9. A method of calibrating a balancing machine that is capable of rotating a workpiece about an axis of rotation and determining a dynamic unbalance of said aforementioned workpiece comprising the steps of:

operatively mounting a base workpiece in the machine, spinning the base workpiece in the machine to a predetermined rpm, injecting a known unbalancing load into the base workpiece after the base workpiece has obtained said predetermined rpm, utilizing vibration data from the machine reflective of the known imbalance loads in at least one selected correction plane through the base workpiece to calibrate a balance computer associated with the machine that calculates the amounts and positions of balance weights needed to dynamically balance said aforementioned workpiece.

10. A method of calibrating a work piece balancing machine having a balancing computer, a work piece holding mechanism for gripping and rotatably driving a work piece operatively mounted therein, and at least two discrete unbalance force injecting devices operatively mounted on said machine comprising the steps of:

operatively mounting a work piece as a calibration standard in the work piece holding mechanism and rotatably driving said calibration standard about an axis of rotation, operating a first unbalance force injection device to inject a predetermined load into said work piece holding mechanism and resultantly a calibrating load to said calibration standard in a first calibration plane thereof to effect the rotational imbalance of said standard, effecting a first calibration of said balancing computer with an unbalancing data resulting from a force injection from said first force injection device so that the balancing computer can subsequently recognize the synchronization and vibration data signals from the rotating calibration standard to thereby effect an initial calibration of the balancing computer, while the calibration standard is still being rotationally driven operating a second force injecting device so that said second force injecting device injects a predetermined injection load into said work piece holding mechanism and a resulting calibrating load into the calibration standard in a second calibrating plane spaced from the first calibration plane to effect the rotational imbalance of the standard work piece, effecting a second calibration of said balancing computer with the unbalancing data resulting from the injection of the calibration from said second force injection device so that said balancing computer can subsequently recognize the synchronization and vibration data signals from rotating work pieces being balanced by said machine.

* * * * *